(12) United States Patent
Song et al.

(10) Patent No.: US 6,654,087 B2
(45) Date of Patent: Nov. 25, 2003

(54) TRANSFLECTIVE LIQUID CRYSTAL DISPLAY DEVICE

(75) Inventors: In-Duk Song, Kyoungsangbuk-do (KR); Sung-Il Park, Kyonggi-do (KR); Jae-Young Chung, Pusan (KR)

(73) Assignee: L.G. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/781,541

(22) Filed: Feb. 12, 2001

(65) Prior Publication Data
US 2001/0019385 A1 Sep. 6, 2001

(30) Foreign Application Priority Data
Feb. 10, 2000 (KR) .......................................... 2000-6222

(51) Int. Cl.[7] ...................... G02F 1/1333; G02F 1/1335
(52) U.S. Cl. ........................ 349/113; 349/138
(58) Field of Search ................ 349/113, 114, 349/117, 138, 143

(56) References Cited
U.S. PATENT DOCUMENTS

| | | | | |
|---|---|---|---|---|
| 4,398,805 A | * | 8/1983 | Cole | ........................ 349/114 |
| 5,986,730 A | * | 11/1999 | Hansen et al. | ................. 349/96 |
| 6,008,871 A | * | 12/1999 | Okumura | ..................... 349/114 |
| 6,061,106 A | * | 5/2000 | Ahn et al. | ..................... 349/83 |
| 6,078,370 A | * | 6/2000 | Wang et al. | ................... 349/75 |

* cited by examiner

*Primary Examiner*—Toan Ton
(74) *Attorney, Agent, or Firm*—Morgan Lewis & Bockius LLP

(57) ABSTRACT

The present invention provides a transflective LCD device that has a common contrast ratio in both the transmissive mode and the reflective mode. It also discloses a transflective LCD device that has an equal luminance in both the transmissive mode and the reflective mode. The transflective LCD device includes first and second substrates; a transparent conductive electrode on the first substrate; a lower passivation layer on the transparent conductive electrode; a reflective electrode formed on the lower passivation layer, the reflective electrode including a transmitting hole; a first QWP (quarter wave plate) under the first substrate; a lower polarizer formed under the first QWP; a second QWP on the second substrate; an upper polarizer formed on the second QWVP; an upper passivation layer under the second substrate; a transparent common electrode under the upper passivation layer; a liquid crystal layer interposed between the first and second substrates; and a backlight device arranged below the second substrate.

7 Claims, 4 Drawing Sheets

TRANSFLECTIVE LIQUID CRYSTAL DISPLAY DEVICE

This application claims the benefit of Korean Patent Application No. 2000-6222, filed on Feb. 10, 2000, under 35 U.S.C. §119, the entirety of which is hereby incorporated by reference.

BACKGROUND OF THE INVENTION

1. Field of the Invention

The present invention relates to a liquid crystal display (LCD) device, and more particularly, to a transflective LCD device.

2. Description of Related Art

Until now, the cathode-ray tube (CRT) has been developed for and is used mainly for the display systems. However, the flat panel display is beginning to make its appearance due to the requirements of small depth dimensions, undesirably low weight and low voltage power supply. At present, the thin film transistor-liquid crystal display (TFT-LCD) with high resolution and small depth dimension has been developed.

During operation of the TFT-LCD, when the pixel is turned ON by switching elements, the pixel transmits light generated from a backlight device. The switching elements are generally amorphous silicon thin film transistors (a-Si:H TFTs) which use an amorphous silicon layer. Advantageously, the amorphous silicon TFTs can be formed on low cost glass substrates using low temperature processing.

In general, the TFT-LCD transmits an image using light from the back light device that is positioned under the TFT-LCD panel. However, the TFT-LCD only employs 3~8% of the incident light generated from the backlight device, i.e., the inefficient optical modulation.

Referring to the drawings, a TFT-LCD device that is manufactured by a conventional method will now be explained in some detail.

FIG. 1 is a graph illustrating a light transmittance respectively measured after light passes through each layer of a conventional liquid crystal display device.

The two polarizers have a transmittance of 45% and, the two substrates have a transmittance of 94%. The TFT array and the pixel electrode have a transmittance of 65%, and the color filter has a transmittance of 27%. Therefore, the typical transmissive TFT-LCD device has a transmittance of about 7.4% as seen in FIG. 1, which shows a transmittance after light passes through each layer of the device. For this reason, the transmissive TFT-LCD device requires a high, initial brightness, and thus electric power consumption by the backlight device increases. A relatively heavy battery is needed to supply a sufficient power to the backlight of such a device. Moreover, there still exists a problem that the battery cannot be used for a long time.

In order to overcome these problems, the reflective TFT-LCD has been developed. Since the reflective TFT-LCD device uses ambient light, it is light and easy to carry. Also, the reflective TFT-LCD device is superior in aperture ratio, compared to the transmissive TFT-LCD device. Namely, since the reflective TFT-LCD substitutes an opaque reflective electrode for a transparent electrode material in the pixel of the conventional transmissive TFT-LCD, it reflects the ambient light.

As described above, since the reflective TFT-LCD device uses ambient light other than an internal light source such as a backlight device, battery life can be increased resulting in longer use times. In other words, the reflective TFT-LCD device is driven using light reflected from the reflective electrode. Thus, only the drive circuitry that drives the liquid crystal uses the battery power in the reflective TFT-LCD device.

Additionally, the reflective TFT-LCD device has a problem that it is affected by its surroundings. For example, the brightness of indoors-ambient light differs largely from that of outdoors-ambient light. Also, even in the same location, the brightness of ambient light depends on the time of day (e.g., noon or dusk). Therefore, the reflective TFT-LCD device cannot be used at night without ambient light.

Accordingly, there is a need for a transflective TFT-LCD device that can be used during daytime hours as well as nighttime because the transflective LCD device can be changed to either a transmissive mode or a reflective mode depending on the users.

FIG. 2 is a schematic cross-sectional view illustrating one pixel of the transflective TFT-LCD device according to the conventional art. As shown, the transflective TFT-LCD device 51 includes a liquid crystal panel and a backlight device 70. The liquid crystal display panel includes lower and upper substrates 50 and 60 and an interposed liquid crystal layer 80. The upper substrate 60 has color filters 61. The lower substrate 50 serves as the array substrate and includes TFTs (not shown), and transmissive and reflective electrodes 54 and 52 serve as a pixel electrode. The reflective electrode 52 surrounds the transmissive electrode 54 and has a light transmitting hole 53 having a length "ΔL". The reflective electrode 52 is also made of a conductive material such as chrome (Cr), aluminum (Al) or tantalum (Ta), which has good light reflectivity and reflects the ambient light 74. The transmissive electrode 54 that is formed in the light transmitting hole 53 transmits the light 72 from the backlight device 70.

The transflective LCD device 51 is operated as follows. First, in the reflective mode, the incident light 74 from the outside is reflected from the reflective electrode 52 and is directed toward the upper substrate 60. At this time, when the electrical signals are applied to the reflective electrode 52 by the switching element (not shown), arrangement of the liquid crystal layer 80 varies and thus the reflected light of the incident light 74 is colored by the color filter 61 and is displayed in the form of colored light. Second, in the transmissive mode, light 72 emitted from the backlight device 70 passes through the transmissive electrode 54 (or transmitting hole 53). At this time, when the electrical signals are applied to the transmissive electrode 54 by the switching element (not shown), arrangement of the liquid crystal layer 80 varies. Thus, the light 72 passing through the liquid crystal layer 80 is colored by the color filter 61 and displayed in the form of images with other colored lights.

FIG. 3 is a cross-sectional view of the conventional transflective LCD device. In FIG. 3, the color filter is not depicted because it does not affect the state of the light. As shown, the conventional transflective LCD device 110 includes a first substrate 106 (an array substrate) and a second substrate 204 (a color filter substrate). A liquid crystal layer 300 that affects the state of the light is interposed between the first substrate 106 and the second substrate 204.

On the surface of the first substrate 106 that faces the second substrate 204 are a TFT (not shown) and a transparent conductive electrode 104 (i.e., a pixel electrode). On the transparent conductive electrode 104 is a lower passivation layer 107. On the lower passivation layer 107 is a reflective electrode 108 (i.e., a pixel electrode) that has a transmitting hole 150. On the other surface of the first substrate 106 a lower polarizer 102. A backlight device 101 is adjacent to the lower polarizer 102. The lower polarizer 102, the first substrate 106, the transparent conductive electrode 104, the lower passivation layer 107 and the reflective electrode 108 are all together referred to as a lower substrate 100.

On one surface of the second substrate 204 is a retardation film (Quarter Wave Plate ($\lambda/4$ plate) referred to hereinafter as a QWP 206. On the QWP 206 is an upper linear polarizer 208. An upper passivation layer 202 that protects the color filters (not shown) is on the other surface of the second substrate 204. The passivation layer 202, the second substrate 204, the QWP 206, and the upper polarizer 208 are all together referred to as an upper substrate 200.

The reflective electrode 108 is made of a reflective metallic material having a good light reflectivity, such as Al, Cr or Ta. The transmitting hole 150 of the reflective electrode 108 transmits the light from the backlight device 101 to the upper substrate 200 via the liquid crystal layer 300. The QWP 206 changes the state of the light. Namely, the QWP 206 converts the linearly polarized light into the right- or left-handed circularly polarized light, and it also converts the right- or left-handed circularly polarized light into the linearly polarized light of which polarization direction is 45° or 135°.

FIGS. 4A and 4B illustrate the state of the ambient light through selected components of the conventional transflective LCD device 110 of FIG. 3 when in the reflective mode. The conventional transflective LCD device has a normally white (NW) mode, i.e, the transflective LCD device displays a white color when a signal voltage is not applied.

FIG. 4A shows the state of the ambient light in the reflective mode when a signal voltage is not applied, i.e., the TFT is turned OFF. The ambient light illuminates the upper linear polarizer 208. Only the portion of the ambient light that is parallel with the transmissive axis of the upper polarizer 208 passes through the upper polarizer 208 as linearly polarized light (45° from x-axis of reference frame). The linearly polarized light is changed into left-handed circularly polarized light by the QWP 206 of which slow axis is parallel with x-axis of reference frame. The left-handed circularly polarized light passes through the liquid crystal layer 300 that has optical retardation (defined by $d \cdot \Delta N$) $\lambda/4$ of which LC direction is parallel with y-axis of reference frame. The left-handed circularly polarized light is then converted into linearly polarized light of which polarization direction is 45° as it passes through the liquid crystal layer 300. The linearly polarized light is then reflected by the reflective electrode 108. The reflected linearly polarized light is converted back into a left-handed circularly polarized light as it passes through the liquid crystal layer 300. The left-handed circularly polarized light is then converted into a linearly polarized light of which polarization direction is 45° as it passes through the QWP 206. The linearly polarized light is parallel to the transmissive axis of the upper polarizer 208, and thus passes through the upper linear polarizer 208. Thus, the LCD device produces a white color.

FIG. 4B shows the state of the ambient light in the reflective mode when a signal voltage is applied, i.e., the TFT is turned ON. In the ON-state, the liquid crystal layer 300 does not affect polarization state of the incident light. Thus, incident light passes through the liquid crystal layer without any change of polarization state.

Accordingly, the ambient light that passes through the upper polarizer 208 as linearly polarized light is converted into left-handed circularly polarized light by the QWP 206. The left-handed circularly polarized light passes through the second substrate 204, the upper passivation layer 202, and the liquid crystal layer 300. The left-handed circularly polarized light is then reflected by the reflective electrode 108, which causes the left-handed circularly polarized light to convert into right-handed circularly polarized light that has phase shift 90° via a mirror effect. The right-handed circularly polarized light then passes through the liquid crystal layer 300, through the upper passivation layer 202, and through the second substrate 204. The right-handed circularly polarized light is converted into linearly polarized light of which polarization direction is 135° as it passes through the QWP 206. That linearly polarized light is perpendicular to the transmissive axis of the upper polarizer 208, and as such does not pass through the upper linear polarizer 208. Thus, the LCD device results in a black color.

FIGS. 5A and 5B illustrate the state of the light from the backlight device 101 through selected components of the conventional transflective LCD device 110 of FIG. 3 when in the transmissive mode.

FIG. 5A shows the state of the light from the backlight device in the transmissive mode when a signal voltage is not applied, i.e., the TFT is turned OFF. The light from the backlight device enters the lower polarizer 102. In this case, transmissive axis of the lower polarizer is arranged parallel with that of the upper polarizer. Only the portion of the light that is parallel with the transmissive axis of the lower polarizer 102 passes through the lower polarizer 102 as linearly polarized light of which polarization direction is 45°. That linearly polarized light then passes through the first substrate 106, through the transparent conductive electrode 104, through the lower passivation layer 107, and through the transmitting hole 150 of the reflective electrode 108. Then, the linearly polarized light is converted into left-handed circularly polarized light as it passes through the liquid crystal layer 300, this being due to a optical retardation $\lambda/4$ of the liquid crystal layer 300. The left-handed circularly polarized light then passes through the upper passivation layer 202 and through the second substrate 204. As the left-handed circularly polarized light passes through the QWP 206, the left-handed circularly polarized light is converted into linearly polarized light of which polarization direction is 45°. That linearly polarized light is polarized parallel with the transmissive axis of the upper polarizer 208, and thus passes through the upper linear polarizer 208. Thus, the LCD device produces a white color.

FIG. 5B shows the state of the light from the backlight device in the transmissive mode when a signal voltage is applied, i.e., the TFT is turned ON. The liquid crystal does not affect the incident light. Thus, the incident light passes through the liquid crystal layer without any change of polarization state. As depicted in FIG. 5B, the light from the backlight device 101 enters the lower polarizer 102. Only the linearly polarized light of the light of which polarization direction is 45° can pass through the lower polarizer 102. The linearly polarized light then passes through the first substrate 106, through the transparent conductive electrode 104, through the passivation layer 107, through the transmitting hole 150, and through the liquid crystal layer 300. The linearly polarized light also passes through the upper passivation layer 202 and through the second substrate 204 without any change of polarization state. The linearly polarized light is then converted into right-handed circularly polarized light by the QWP 206. Only the portion of the right-handed circularly polarized light that is parallel with the transmissive axis of the upper polarizer 208 passes through the upper polarizer 208. Thus, about 50% of the right-handed circularly polarized light can pass through the upper polarizer 208, and the LCD device produces a dark gray color.

As described above, the conventional transflective TFT-LCD device has both the reflective mode and the transmissive mode such that it can be used in anywhere and anytime of the day. However, referring to FIG. 5B, the LCD device produces the dark gray color, contrary to the FIG. 4B, although it should display the black color when the signal voltage is applied. This is because about 50% of right-handed circularly light having passed through the QWP 206 can pass through the upper polarizer 208.

Therefore, since the difference of the luminance occurs between in the reflective mode and in the transmitting mode when the TFT is turned ON, the definition and picture quality of the transflective LCD device are lowered. These results are because the transflective LCD device is designed more focusing on the reflective mode and because cell gaps "d1" (see FIG. 3) of the reflective portion and "d2" (see FIG. 3) of the transmitting portion are substantially equal. Namely, the ambient light in the reflective mode passes through the liquid crystal layer twice due to reflection of the reflective electrode, while the light from the backlight device in the transmissive mode passes through the liquid crystal layer just once. Thus, there is the light path difference between in the reflective mode and the transmissive mode, and the transflective LCD device cannot produce the pure black color when the signal voltage is applied. Especially, the transflective LCD device does not display the black color in the transmissive mode when the signal voltage is applied.

SUMMARY OF THE INVENTION

Accordingly, the present invention is directed to a transflective LCD device that substantially overcomes one or more of the problems due to limitations and disadvantages of the related art.

To overcome the problems described above, a preferred embodiment of the present invention provides a transflective LCD device that increases the luminance and that has a common contrast ratio.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, the preferred embodiment of the present invention provides a transflective liquid crystal display (LCD) device, including: first and second substrates; a transparent conductive electrode on the first substrate; a lower passivation layer on the transparent conductive electrode; a reflective electrode formed on the lower passivation layer, the reflective electrode including a transmitting hole; a first QWP (quarter wave plate) under the first substrate; a lower polarizer formed under the first QWP; a second QWP on the second substrate; an upper polarizer formed on the second QWP; an upper passivation layer under the second substrate; a transparent common electrode under the upper passivation layer; a liquid crystal layer interposed between the first and second substrates; and a backlight device arranged below the second substrate.

The first and second substrates of the LCD device are made of glass, and the transparent conductive electrode is made of Indium-Tin-Oxide (ITO).

The liquid crystal layer has a first cell gap between the reflective electrode and the upper passivation layer and it also has a second cell gap between the lower passivation layer and the second substrate.

The second cell gap is about twice than that of the first cell gap. Moreover, the cell gaps are controlled by the thickness of the upper passivation layer.

It is to be understood that both the foregoing general description and the following detailed description are exemplary and explanatory and are intended to provide further explanation of the invention as claimed.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to the preferred embodiment of the present invention, example of which is illustrated in the accompanying drawings.

Figure 6:
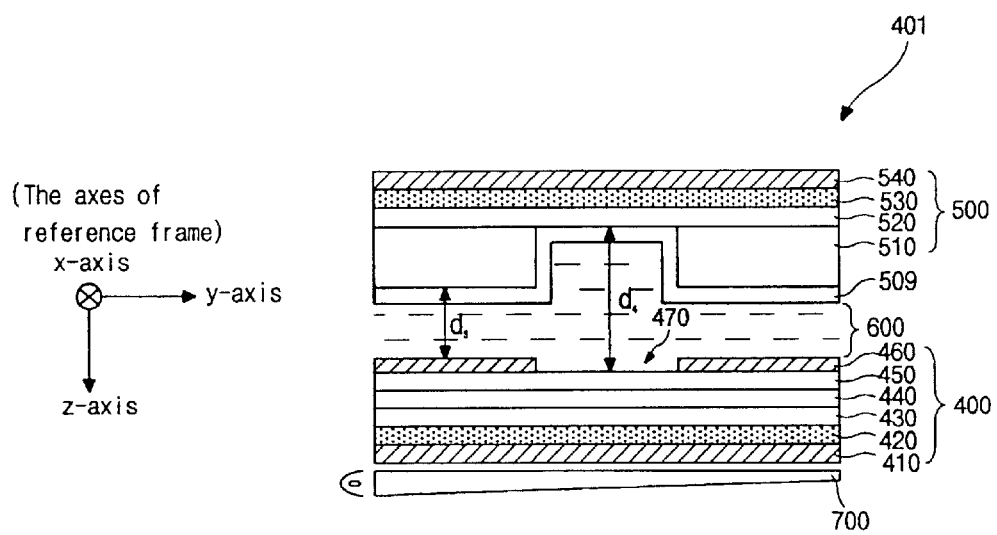
FIG. 6 is a cross-sectional view illustrating elements of the transflective LCD device according to a preferred embodiment of the present invention.

FIG. 6 is a cross-sectional view of a transflective LCD device according to a preferred embodiment of the present invention. In FIG. 6, the color filter is not depicted because it does not affect the polarization state of the light. As shown, the transflective LCD device 401 is widely divided into a backlight device 700, a lower substrate 400, a liquid crystal layer 600 and an upper substrate 500. The liquid crystal layer 600 affecting polarization state of the light is interposed between the lower substrate 400 and the upper substrate 500. The backlight device 700 is arranged under the lower substrate 400 and emits light into the liquid crystal layer 600. Although not depicted, orientation films that contact the liquid crystal layer 600 are formed on the lower substrate 400 and under the upper substrate 500, respectively. The rubbing process is then performed on the surfaces of the orientation films.

The lower substrate 400 includes a first transparent substrate 430, a transparent conductive electrode 440, a lower passivation layer 450, a reflective electrode 460 having a transmitting hole 470, a first QWP 420 and a lower polarizer 410. On the surface of the first transparent substrate 430 that faces the upper substrate 500 are a TFT (not shown) and the transparent conductive electrode 440 (i.e., a pixel electrode). On the transparent conductive electrode 440 is the lower passivation layer 450. On the lower passivation layer 450 is the reflective electrode 460 that has the transmitting hole 470. On the other surface of the first substrate 430 is the first QWP 420. The lower polarizer 410 is formed under the first substrate 430.

The upper substrate 500 includes a transparent common electrode 509, an upper passivation layer 510, a second transparent substrate 520, a second QWVP 530 and an upper polarizer 540. On one surface of the second transparent substrate 520 is the second QWP 530. On the second QWP 530 is the upper linear polarizer 540. The upper passivation layer 510 is formed on the other surface of the second substrate 520. The portion of the upper passivation layer 510, corresponding in size to the transmitting hole 470, is eliminated in order to make a cell gap larger. And the transparent common electrode 509 is formed on the upper passivation layer 510 and on the second transparent substrate 520.

The reflective electrode 460 is made of a reflective metallic material having a good light reflectivity, such as Cr, Al or Ta. The transmitting hole 470 of the reflective electrode 460 transmits the light from the backlight device 700 to the upper substrate 500 via the liquid crystal layer 600. The first and second QWPs 420 and 530 change the polarization state of the light. Namely, the first and second QWPs 420 and 530 convert the linearly polarized light into the right- or left-handed circularly polarized light, and they also convert the right- or left-handed circularly polarized light into the linearly polarized light of which polarization direction is 45° or 135° from x-axis of reference frame. A cell gap "d3" is defined in the interval 460 between the reflective electrode 460 and the upper passivation layer 510, i.e., a reflective portion. And a second cell gap "d4" is defined in the interval between the lower passivation layer 450 and the second transparent substrate 520, i.e., a transmitting portion. As shown, the upper passivation layer 510 of the upper substrate 500 is formed in order to make a difference between "d3" and "d4". Thus, the two thicknesses of the liquid crystal layer 600, i.e., the cell gaps, are different from each other. Beneficially, the second cell gap "d4" is twice as long as the first cell gap "d3" (i.e., d4=2d3). Therefore, the distance of the light path in the transmissive mode is equal to that of the light path in the reflective mode. Thus, the contrast ratio is raised.

Figure 5A:
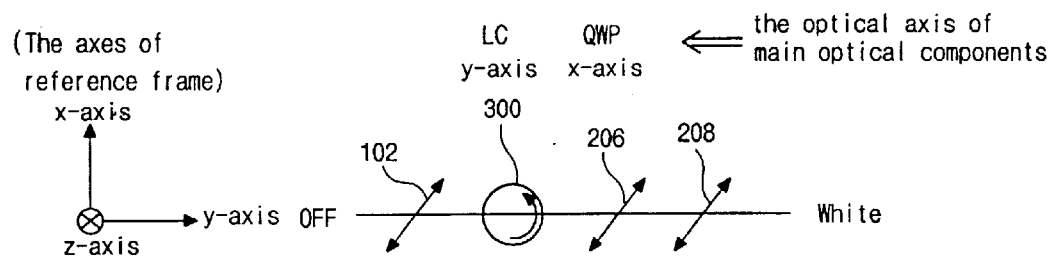
FIGS. 5A and 5B are views illustrating light from a backlight device passing through components of the transflective LCD device of FIG. 3 when it is operating in a transmissive mode.
Figure 5B:
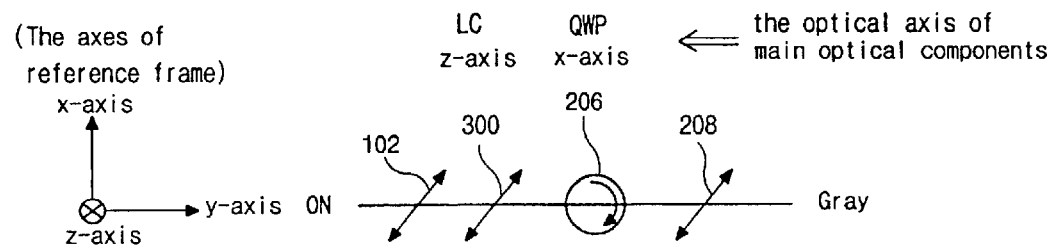

Referring back to FIG. 5B, the light after passing through the QWP 206 is the left-handed circularly polarized light, and about 50% of the left-handed circularly polarized light that is parallel with the transmissive axis of the upper polarizer 208 can pass through the upper polarizer 208. Thus, the LCD device produces a dark gray color. However, in the present invention, the left-handed circularly polarized light becomes perpendicular to the upper polarizer, and as such the LCD device produces a black color. For the purpose of producing the black color, the transflective LCD device of the present invention, as shown in FIG. 6, includes the first QWP 420 in the lower substrate 400. By adopting the first QWP 420, the LCD device can display the pure black color in the transmissive mode when the signal voltage is applied, and it can also display the pure white color when the signal voltage is not applied.

Figure 7A:
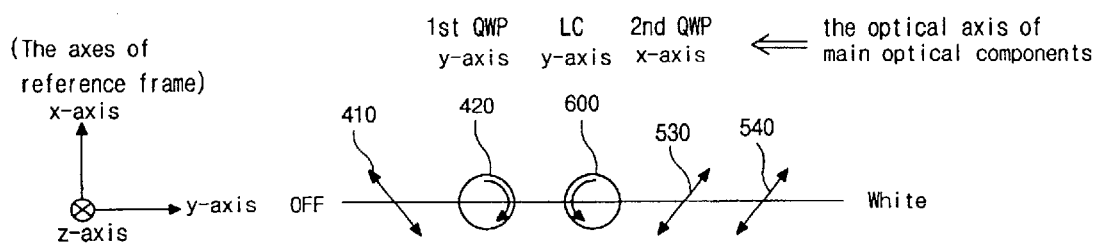
FIGS. 7A and 7B are views illustrating light from a backlight device passing through components of the transflective LCD device of FIG. 6 when it is operating in a transmissive mode.
Figure 7B:
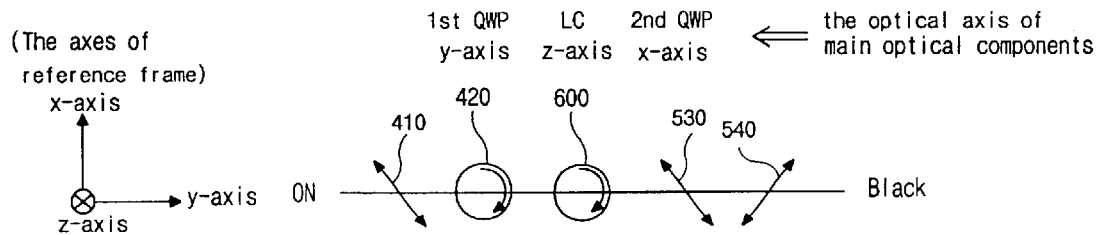

FIGS. 7A and 7B are views illustrating light from a backlight device passing through components of the transflective LCD device of FIG. 6 when it is operating in a transmissive mode.

FIG. 7A shows the polarization state of the light from the backlight device in the transmissive mode when a signal voltage is not applied, i.e., the TFT is turned OFF. The light from the backlight device enters the lower polarizer 410. Only the portion of the light that is parallel with the transmissive axis of the lower polarizer 410 passes through the lower polarizer 410 as linearly polarized light of which polarization direction is 135 from x-axis of reference frame. That linearly polarized light is converted into the right-handed circularly polarized light as it passes through the first QWP 420. The right-handed circularly polarized light then passes through the lower substrate 430; through the transparent conductive electrode 440 (i.e. the pixel electrode); through the lower passivation layer 450; and through the transmitting hole 470. Then, the right-handed circularly polarized light is converted into left-handed circularly polarized light having phase difference 180° as it passes through the liquid crystal layer 600, this being due to the fact that the liquid crystal layer 600 has the optical retardation λ/2. The right-handed circularly polarized light then passes through the transparent common electrode 509 and through the second substrate 520. As the left-handed circularly polarized light passes through the second QWP 530 the left-handed circularly polarized light is converted into linearly polarized light of which polarization direction is 45° from x-axis of reference frame. The linearly polarized light is polarized parallel with the transmissive axis of the upper polarizer 540, and thus passes through the upper linear polarizer 540. Thus, the LCD device produces a white color.

When the TFT is turned OFF in the reflective mode, the liquid crystal layer has the phase difference λ/4 like the QWP. However, when the TFT is turned OFF in the transmissive mode, if the cell gap "d4" (see FIG. 6) of the liquid crystal layer is about double, the optical retardation of the liquid crystal layer is λ/2. For more detailed explanation, the relation between the cell gap and the optical retardation of the liquid crystal layer can be calculated by the following equations.

$$\Delta nd_3 = \frac{\lambda}{4} \text{(in the reflective mode)} \qquad (1)$$

$$\Theta d_4 \cong 2d_3$$

$$\Delta nd_4 \cong \frac{\lambda}{2} \text{(in the transmissive mode)} \qquad (2)$$

Figure 1:
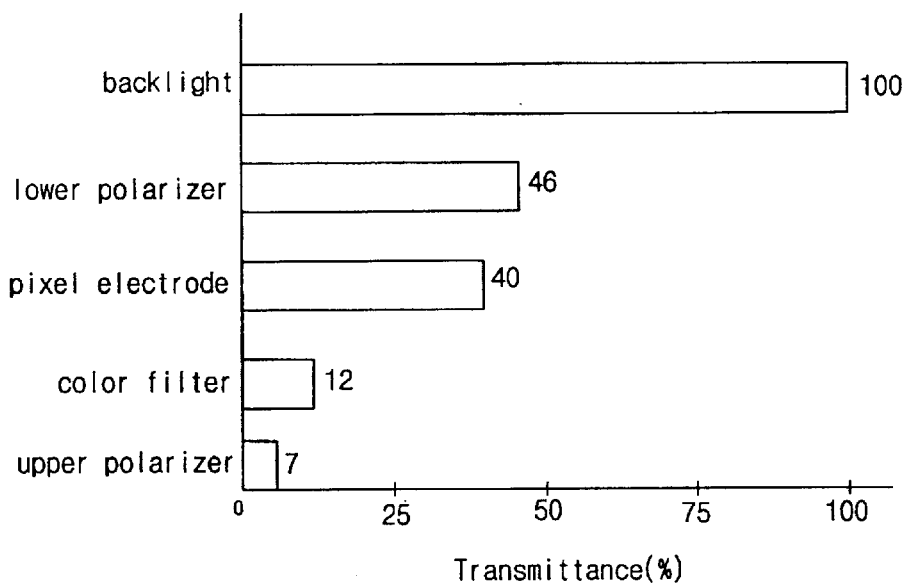
FIG. 1 is a graph illustrating a transmittance respectively measured after light passes through each layers of a conventional liquid crystal display (LCD) device.
Figure 2:
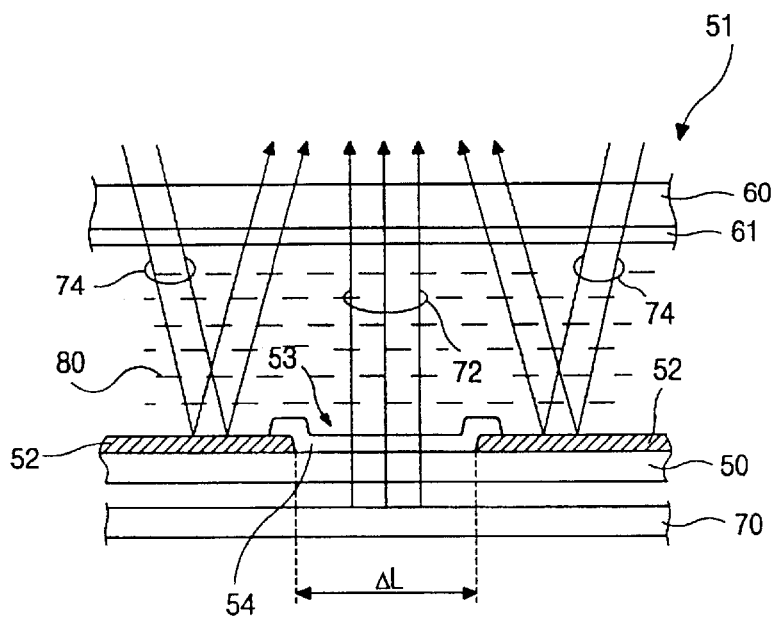
FIG. 2 is a cross-sectional view illustrating an operation of the typical transflective LCD device.
Figure 3:
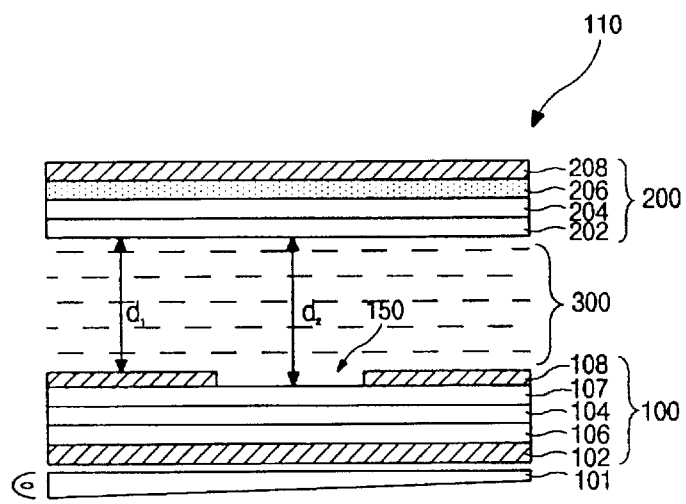
FIG. 3 is a cross-sectional view illustrating elements of the transflective LCD device according to the conventional art.
Figure 4A:
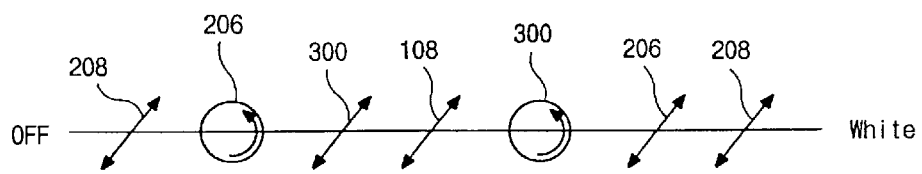
FIGS. 4A and 4B are views illustrating ambient light passing through components of the transflective LCD device of FIG. 3 when it is operating in a reflective mode.
Figure 4B:
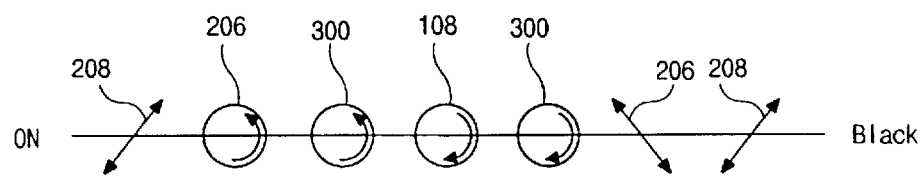

Compared to the conventional LCD device of FIG. 4 when the TFT is turned OFF, while the liquid crystal layer has the optical retardation λ/4 in the conventional transmissive mode whether in the reflective mode or in the transmissive mode, the optical retardation of the liquid crystal layer of the present invention is λ/2 in the transmissive mode such that the linearly polarized light after passing through the second QWP is polarized parallel with the transmissive axis of the upper polarizer. Thus, the LCD device produces a white color.

FIG. 7B shows the polarization state of the light from the backlight device in the transmissive mode when a signal voltage is applied, i.e., the TFT is turned ON. The liquid crystal molecules of the liquid crystal layer 600 do not affect the incident light. Thus, the incident light passes through the liquid crystal layer 600 without any change of polarization state. As depicted in FIG. 7B, the light from the backlight device enters the lower polarizer 410. Only the linearly polarized light, of which polarization direction is 135°, of the light can pass through the lower polarizer 410. The linearly polarized light is converted into the right-handed circularly polarized light as it passes through the first QWP 420. The right-handed circularly polarized light then passes through the first substrate 430; through the transparent conductive electrode 440 (i.e. the pixel electrode); through the lower passivation layer 450; and through the transmitting hole 470 of the reflective electrode 460. The right-handed circularly polarized light also passes through the liquid crystal layer 600 without any change of polarization state. The right-handed circularly polarized light then passes through the transparent common electrode 509 and through the second substrate 520. The right-handed circularly polarized light is then converted into linearly polarized light of which polarization direction is 135° by the second QWP 530. The linearly polarized light is polarized perpendicular to the transmissive axis of the upper polarizer 540, and thus does not pass through the upper linear polarizer 540. Thus, the LCD device produces a black color.

As described above, the first QWP 420 is adopted in the lower substrate 400 in order to make the luminance equal in both the transmissive mode and the reflective mode. By making the cell gap of the transmitting portion twice than that of the reflective portion, the transflective LCD device displays a black color in the transmissive mode when the TFT is turned ON.

Therefore, since the transflective LCD device of the present invention produces a pure black color when the TFT is turned ON whether in the transmissive mode or in the reflective mode, the definition and picture quality can be compared with the conventional transmissive LCD. Moreover, the contrast ratio increases according to improved darkness of black color contrast between light and darkness.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A transflective liquid crystal display (LCD) device comprising:

first and second substrates;
   a transparent conductive electrode on the first substrate;
   a lower passivation layer on the transparent conductive electrode;
   a reflective electrode formed on the lower passivation layer, the reflective electrode including a transmitting hole;
   a first QWP (quarter wave plate) under the first substrate;
   a lower polarizer formed under the first QWP;
   a second QWP on the second substrate;
   an upper polarizer formed on the second QWP;
   an upper passivation layer under the second substrate;
   wherein the upper passivation layer is patterned, and the thickness of the upper passivation layer corresponding to the reflective electrode is thicker than that of corresponding to the transmitting hole;
   a step-wise continuous transparent conductive electrode under the upper passivation layer;
   a liquid crystal layer interposed between the first and second substrates; and
   a backlight device arranged below the first substrate.

2. The transflective liquid crystal display (LCD) device of claim 1, wherein the first and second substrates are made of glass.

3. The transflective liquid cystal display (LCD) device of claim 1, wherein the liquid crystal layer has a first cell gap between the reflective electrode and the upper passivation layer.

4. The transflective liquid crystal display (LCD) device of claim 3, wherein the liquid crystal layer has a second cell gap between the lower passivation layer and the second substrate.

5. The transflective liquid crystal display (LCD) device of claim 1, wherein the transparent conductive electrode is made of Indium-Tin-Oxide (ITO).

6. The transflective liquid crystal display (LCD) device of claim 4, wherein the second cell gap is twice as wide as the first cell gap.

7. The transflective liquid crystal display (LCD) device of claim 4, wherein the cell gaps are controlled by a thickness of the upper passivation layer.

* * * * *